United States Patent
Ashikawa

(10) Patent No.: US 6,180,160 B1
(45) Date of Patent: Jan. 30, 2001

(54) BANANA FLOWER TEA

(76) Inventor: James K. Ashikawa, 320 Fernando Ave., Palo Alto, CA (US) 94306

( * ) Notice: Under 35 U.S.C. 154(b), the term of this patent shall be extended for 0 days.

(21) Appl. No.: 09/398,512

(22) Filed: Mar. 6, 2000

Related U.S. Application Data

(60) Provisional application No. 60/100,121, filed on Sep. 14, 1998.

(51) Int. Cl.⁷ .............................. A23F 3/00; A23F 3/16; A23F 3/34; A23L 2/38
(52) U.S. Cl. ........................................... 426/597; 426/590
(58) Field of Search ...................................... 426/597, 590

(56) References Cited

U.S. PATENT DOCUMENTS 3,709,694 * 1/1973 Killinger et al. .

OTHER PUBLICATIONS

Leaflet No. 7—Banana, Pulcihsed by the South Pacific Comiision, 1983.*
Recipes of the Phillipines. Author: David–Perez, 1973.*

* cited by examiner

*Primary Examiner*—Anthony J. Weier

(57) ABSTRACT

A tea is made from the flowers of a banana plant from the genus Musa. Also described is the method of making a banana flower tea using steps including cutting, drying, and roasting under certain conditions.

7 Claims, No Drawings

BANANA FLOWER TEA

This application claims the benefit of the U.S. provisional application Ser. No. 60/100,121, filed Sep. 14, 1998.

DETAILED DESCRIPTION OF THE INVENTION

From the earliest time herbal plants have been used to treat and heal or comfort the sick. In recent years the medicinal value of herbs have been rediscovered. Even pharmaceutical companies have renewed their effort to search for potent new drugs in wild tropical plants.

Today display shelves in supermarkets, major drug stores, and health food stores are filled with hundreds of natural or artificially enriched and flavored teas but nutritionally and healthwise none of these can equal banana blossom tea. Rich in vitamins, minerals, amino acids, and other essential nutrients, it is the world's most beneficial tea. It is naturally rich in potassium and magnesium, minerals that have been clinically proven to benefit the heart by reducing high blood pressure, heart attacks, and strokes. It is believed that banana flowers are also rich in antioxidants and tannins. Antioxidants are chemicals known to help prevent cancers and combat aging and tannins have been reported to prevent bladder and urinary tract infections in women. Interestingly, banana flower also contains nutrients that bees convert into royal jelly that are needed by bee colonies to survive. Endowed with these beneficial nutrients and disease fighting chemicals, Banana blossom tea is the greatest tea since the discovery of tea in China over 4000 years ago. Naturally caffein free, not artificially decaffeinated, this pleasant, mildly aromatic tea will complement any meal and is the perfect after dinner and bed time beverage. It is great for people of all ages, from children to senior citizens and is the tea naturally designed for people with glaucoma, hypertension, hyperthyroidism, hypoglycemia, and other illnesses. It is truly the TEA OF THE NEW MILLENNIUM.

South East Asians consider banana flowers a health food and to this day use the flowers to prepare tasty native cuisines. Banana flowers, however, have remained virtually unknown to people living in temperate regions of the world because banana is a tropical plant and, but for some ornamental varieties, does not thrive in cold climate.

Banana is the world's most unique fruit tree. It evolved in a tropical jungle, very likely, during the Mesozoic era when dinosaurs roamed the earth and the continents of Africa, Asia, and Americas were a single mega-continent called Pangaea. It may explain why banana appeared in the jungles of these continents before people began cultivating them. Unlike other fruit trees that bear fruits for many decades, some varieties will bear fruit for well over a hundred years, every banana tree dies after producing just one large magnificent flower that blooms continuously for almost a year producing clusters of fruits on a bunch often weighing over 100 pounds.

Banana was first cultivated in the Land of the Pharoahs several millenniums ago. Very possibly they were the first to use this magnificent and rare flower to brew the sacred tea of the Pharoahs. But such sacred knowledge, had it existed, is lost forever in the dust of antiquity. Today banana is intensively cultivated in Ecuador, the Philippines, and other tropical countries and billions of pounds of the highly nutritious fruits are marketed worldwide.

Five years ago I decided to try converting this exotic flower into tea because most herbal plants have medicinal value and banana is an herbal plant. Besides huge quantities of this valuable resource are being discarded. Fortunately I was able to convert the flowers into a mild, pleasant tasting tea. To continue my research, I had to find a large reliable source and decided on Ecuador because it is the world's largest producer of bananas with annual export exceeding 9 billion pounds. Based on their annual production, I estimate that Ecuador alone produces over 300 million pounds of banana flowers, most of which are left to rot in the field because a significant market for the flowers has not been developed.

Banana is a fruit that does not react kindly to refrigeration, turning black and undesirable when chilled. For this reason green bananas are shipped in containers kept at 57° F. I had samples of banana flowers shipped to me from Ecuador in a similar container. Unfortunately, at 57° F., the temperature was too high and most of the banana flowers rotted during shipment owing to excessive condensation in the container. If banana flowers are chilled to below 40° F. to prevent spoilage, the white heart of the flowers will turn black, also making them undesirable. At ambient temperatures banana flowers will bloom continuously dropping all their petals. For these reasons, even if a large market for fresh banana flowers existed, it will be difficult to export fresh banana flowers from Ecuador and other distant countries.

It is a fortuitous discovery that banana flowers can be converted into tea because banana flowers are produced in countries that can least afford to waste this natural resource.

The banana flower tea is produced by a process of first obtaining fresh banana flowers and trimming, cleaning, and washing same. This is followed by the step of cutting/shredding the flowers wherein said flowers are cut manually or mechanically. The flowers are then dried in a dryer or sun dried followed by roasting. Roasting of the banana flowers takes place in a roaster at 400–450 F. for 5–7 minutes. The roasted flowers may then be milled, blended with desired flavor and aroma materials, and packaged in tea bags and boxes for subsequent brewing to form a banana flower tea beverage. It should be noted that all equipment and machines needed to manufacture the banana flower tea are commercially available and used in the manufacturing of food and drug products.

BRIEF DESCRIPTION OF THE DRAWING

The figure is a flowchart drawing of the process of making the banana flower tea of the instant invention.

SUMMARY

Banana flower tea (Banana blossom tea) is made from the flowers of banana plants (Genus: Musa). The most nutritious herbal flower, it is rich in vitamins, minerals, essential amino acids and other nutrients that are needed to keep our body disease free and healthy. It is believed to be an excellent source of antioxidants and tannins. Antioxidants are chemicals known to help prevent cancers and combat aging and tannins have been reported to prevent bladder and urinary tract infections in women.

In cultivating bananas for their highly nutritious fruits, hundreds of millions of pounds of banana flowers are incidentally produced. Based on Ecuador's annual export of bananas, I have estimated that Ecuador alone produces over 300 million pounds of banana flowers. Unfortunately most of these flowers are unutilized and are generally discarded. For these reasons I investigated ways to utilize this herbal flower and discovered that by using controlled thermal treatment, the flowers can be converted into a pleasant tasting, highly nutritious, caffein free herbal tea.

What is claimed is:

1. A method of making banana flower tea comprising:
   (a) obtaining fresh banana flowers of the banana plant genus Musa;
   (b) cutting or shredding said banana flowers manually or mechanically;
   (c) roasting the cut or shredded banana flowers; and
   (d) brewing said roasted banana flowers to form a banana flower tea.

2. The method of claim 1 wherein said roasting is conducted at a temperature between 400 C. and 450 C. for 5 to 7 minutes.

3. The method of claim 1 or 2 wherein the banana flowers are dried in a drier or sun dried between steps (b) and (c).

4. The method of claim 3 further comprising the step of milling said banana flowers between steps (c) and (d).

5. The method of claim 4 further comprising blending flavor and aroma components to the banana flowers after milling same.

6. The method of claim 5 further comprising packaging the banana flowers after blending flavor and aroma components therein and prior to brewing same.

7. A banana flower tea product made from the method of claim 1.

* * * * *